Patented Dec. 2, 1941

2,264,888

UNITED STATES PATENT OFFICE 2,264,888

PRODUCTION OF HYDROXYKETONES OF THE CYCLOPENTANOPOLYHYDROPHEN- ANTHRENE SERIES

Rupert Oppenauer, Amsterdam, Netherlands, assignor, by mesne assignments, to Roche-Organon, Inc., Nutley, N. J., a corporation No Drawing. Application August 15, 1938, Serial No. 225,003. In the Netherlands September 3, 1937

22 Claims. (Cl. 260—397.5)

This invention relates to a new and useful improvement in the production of hydroxyketones of the cyclopentanopolyhydrophenanthrene series.

It is the object of my invention to provide a new method for the conversion of polyketones of said series into hydroxyketones. As an example of a polyketone the androstene-4-dione-3,17 [I] may be mentioned.

I

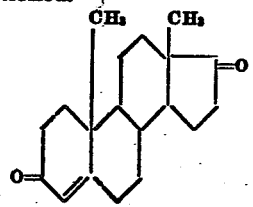

It may be obtained e. g. from androstene-5-ol-3-one-17 [II]

II

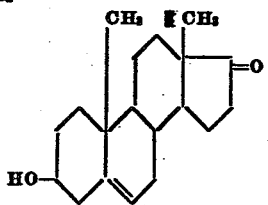

which may be obtained e. g. by oxidation of cholesterol. As an example of the hydroxyketones to be obtained by the process of my invention androstene-4-one-3-ol-17 [III] may be mentioned.

III

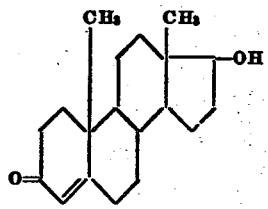

The conversion of I or II into III has been accomplished e. g. by a series of partial acylations, reductions and oxidations.

I now have found that a very effective way of converting compounds of the type I into compounds of the type III is as follows:

The polyketones of the type I may be partially reduced to compounds of the pinacone type IV.

IV

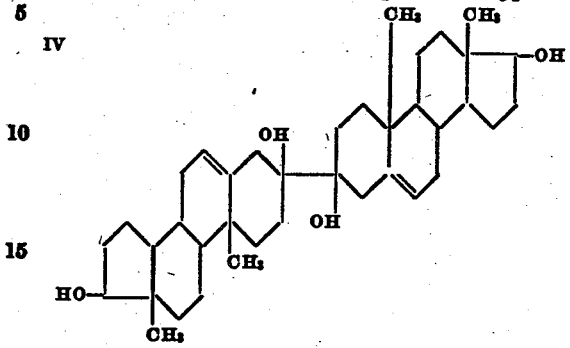

Thus e. g. one molecule of IV is formed from two molecules of I.

These pinacones are difficultly soluble in ethanol and may be isolated in the crystalline state.

These pinacones may be reoxidated to form hydroxyketo-compounds of the type III.

The reduction of the polyketones to the pinacones is preferably effected with the amalgams of sodium or aluminium; however, other reducing agents may be employed in such amounts as to avoid a complete reduction to the polyhydroxy compounds.

Further it has been found that in part of the pinacones thus formed the keto groups at $C_{17}$ are not reduced to alcohol groups as, upon oxidation, part of the product proved to be the polyketone used as a starting material. This reduces the yield of hydroxyketones. I have found that the yield of the desired end product can be raised by subjecting the crude pinacones obtained as described above to a subsequent mild reduction. Thereby keto groups which have not been reduced during the formation of the pinacone are reduced to secondary alcohol groups. This reduction is carried out very effectively with alcohols as reducing agents while using metal alcoholates as catalysts. These reduced pinacones can also be isolated in the crystalline state.

The reoxidation of the pinacones can be effected in several ways.

As the oxidation of the tertiary hydroxyl groups situated at the pinacone bond is aimed at one may use lead tetra acetate as an oxidant. In this case no protection of double bonds, if any, or of secondary hydroxyl groups is necessary. From the reaction product the hydroxyketones formed may be isolated in manners known per se.

On the other hand the oxidation can be effected with the usual oxidants such as chromic acid. In this case the double bonds, if any, have to be protected by the addition of a halogen or a hydrogen halide which is eliminated after oxidation. Further the secondary hydroxyl groups must be protected by conversion into such groups which, by hydrolysis, may be reconverted into free hydroxyl groups. This reconversion, however, is not necessary; especially, when the secondary hydroxyl groups have been acylated the acylates of the hydroxyketones can be isolated from the reaction mixtures.

These acylates, as well as the free hydroxyketones, are known to have excellent therapeutic properties.

In order to elucidate more clearly the invention the following examples are given by way of illustration.

Example 1.—10 gs. of androstene-4-dione-3,17 are dissolved in a mixture of 250 cc. of 60% ethanol and 600 cc. ether. 45 gs. of sodium amalgam are slowly added in the course of one hour. After completion of the reaction the mixture is diluted with water. The ethereal solution is then concentrated in vacuo to about 150 cc. In the cold the pinacone formed crystallizes in needles which are difficultly soluble in ethanol and which melt unsharply at 260° $[\alpha]^{24}_D = +142$–$144°$ in chloroform. 6 gs. of this crude pinacone are now boiled with 25 gs. of aluminiumisopropylate and 300 cc. isopropanol in a flask provided with a rectifying column. The liquid which distills off is replaced by fresh isopropanol. The distillation is continued until the distillate is free from acetone. For this purpose some 800 cc. have to be distilled off.

Now 400 cc. of water are added. The aluminium hydroxide which precipitates is filtered off and washed with warm ethanol. The filtrate and washings are united, concentrated by evaporation and diluted with water. The reduced pinacone precipitates in crystalline form. Yield 4.9 gs.; M. P. 270–273°.

Example 2.—2 gs. of the pinacone obtained as described above are dissolved in 350 cc. dry methanol and allowed to stand for some days with 1.15 mol. lead tetra acetate. After addition of water and filtration the solution is evaporated to dryness. The residue is distilled in a high vacuum. The fraction distilling at 120–130° and $10^{-5}$ mm. Hg is recrystallized from a mixture of ether and petroleumether. The yield is 1.2–1.6 gs. of androstene-4-one-3-ol-17.

Example 3.—12 gs. of the pinacone obtained according to example 1 are dissolved in 100 cc. pyridine. To this solution 20 gs. of acetic anhydride are added. The mixture is allowed to stand for two days and is then diluted with water. This causes the diacetate to precipitate. It is filtered off and recrystallized from a mixture of ethanol and benzene. 12 gs. of the pinacone diacetate are dissolved in 200 cc. of chloroform. To this solution a quantity of bromine calculated for 4 atoms of bromine per molecule of pinacone is slowly added. After elimination of the chloroform in vacuo the residue is dissolved in a mixture of 180 cc. of ether and 1.2 liter of glacial acetic acid. A solution of 5 gs. of chromic anhydride in 100 cc. of 90% acetic acid is added and the whole is allowed to stand for a few days. Upon dilution with 2.5 liters of water the precipitate is filtered off, dissolved in 280 cc. of 80% acetic acid and shaken for some hours at 25° with 20 gs. of zinc dust. After dilution with much water the mixture is extracted with ether. The ethereal solution is washed with sodium carbonate solution and subsequently with water, dried and evaporated. The residue is sublimated in a high vacuum. The fraction distilling at 125–140° is recrystallized from dilute methanol. The yield is 8 gs. of acetoxy-17-androstene-4-one-3; M. P. 135–138° C.

What I claim is:

1. A process comprising treating androstene-4-dione-3,17 with an amalgam of a metal from the class consisting of sodium and aluminium, isolating from the reaction mixture the crude pinacone formed, subjecting said pinacone to the reducing action of an alcohol under the catalytic influence of a metal alcoholate, isolating from the reaction mixture the reduced pinacone having the formula $C_{38}H_{58}O_4$ and the structure

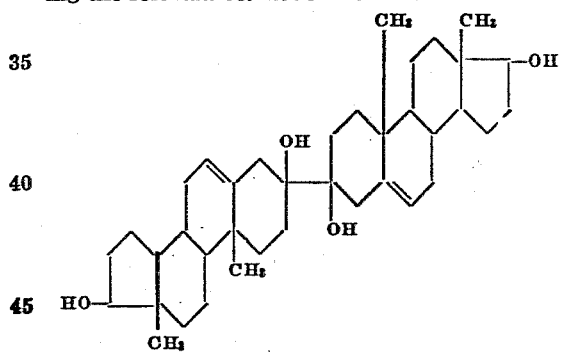

subjecting this reduced pinacone to the action of lead tetraacetate and isolating from the reaction mixture the androstene-4-one-3-ol-17 formed.

2. A process comprising treating androstene-4-dione-3,17 with an amalgam of a metal from the class consisting of sodium and aluminium, isolating from the reaction mixture the crude pinacone formed, subjecting said pinacone to the reducing action for an alcohol under the catalytic influence of a metal alcoholate, isolating from the reaction mixture the pinacone having the formula $C_{38}H_{58}O_4$ and the structure

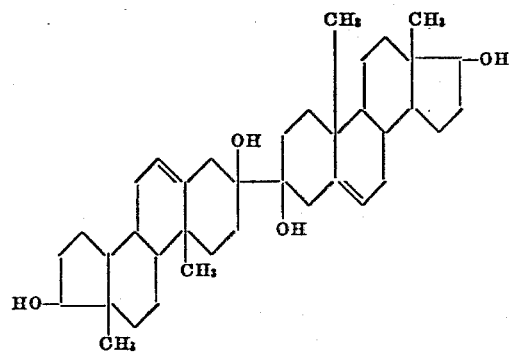

subjecting said pinacone to the action of acylating agents, adding a halogen to the acylate formed thereby, oxidising the acylated and halogenated pinacone with chromic anhydride, eliminating the halogen from the oxidation products by means of zinc powder and isolating from the reaction mixture the acyloxy-17-androstene-4-one-3 formed.

3. As a new product the pinacone having the formula $C_{38}H_{55}O_4$ and the structure

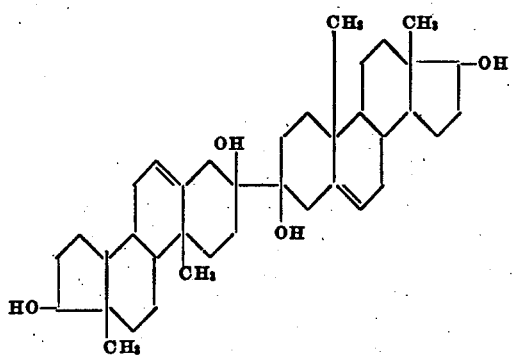

having a melting point of 270-276°.

4. A process comprising treating saturated and unsaturated 3,17-diketones of the cyclopentanodimethylpolyhydrophenanthrene series with reducing agents of the type known for forming pinacones from monoketones and isolating from the reaction mixture the crude pinacones formed.

5. A process comprising treating saturated and unsaturated 3,17-diketones of the cyclopentanodimethylpolyhydrophenanthrene series with amalgams of metals from the class consisting of sodium and aluminum and isolating from the reaction mixture the crude pinacones formed.

6. A process comprising treating saturated and unsaturated 3,17-diketones of the cyclopentanodimethylpolyhydrophenanthrene series with reducing agents of the type known for forming pinacones from monoketones, isolating from the reaction mixture the crude pinacones formed and subjecting said pinacones to the action of oxidizing agents.

7. A process comprising treating saturated and unsaturated 3,17-diketones of the cyclopentanodimethylpolyhydrophenanthrene series with amalgams of metals from the class consisting of sodium and aluminum, isolating from the reaction mixture the crude pinacones formed, subsequently subjecting said pinacones to a further reduction with a reducing agent of the type known for the reduction of ketone groups to secondary alcohol groups, isolating from the reaction mixture the pinacones now substantially free from keto groups, and subjecting said reduced pinacones to the action of oxidizing agents.

8. As new products the saturated and unsaturated pinacones of the cyclopentanodimethylpolyhydrophenanthrene series having the pinacone bond between the carbon atoms occupying the third position of each cyclopentanodimethylpolyhydrophenanthrene nucleus.

9. A process comprising treating saturated and unsaturated 3,17-diketones of the cyclopentanodimethylpolyhydrophenanthrene series with reducing agents of the type known for forming pinacones from monoketones, isolating from the reaction mixture the crude pinacones formed and subjecting said pinacones first to acylation and subsequently to the action of oxidizing agents.

10. A process comprising treating saturated and unsaturated 3,17-diketones of the cyclopentanodimethylpolyhydrophenanthrene series with amalgams of metals from the class consisting of sodium and aluminium, isolating from the reaction mixture the crude pinacones formed, subsequently subjecting said pinacones to a further reduction with a reducing agent of the type known for the reduction of ketone groups to secondary alcohol groups, isolating from the reaction mixture the pinacones now substantially free from keto groups, and subjecting said reduced pinacones first to acylation and subsequently to the action of oxidizing agents.

11. A process comprising treating saturated and unsaturated 3,17-diketones of the cyclopentanodimethylpolyhydrophenanthrene series with amalgams of metals from the class consisting of sodium and aluminum, isolating from the reaction mixture the crude pinacones formed, subsequently subjecting said pinacones to a further reduction with an alcohol in the presence of a metal alcoholate as a catalyst, isolating from the reaction mixture the pinacones now substantially free from keto groups and subjecting said pinacones to the action of oxidizing agents.

12. A process comprising treating saturated and unsaturated 3,17-diketones of the cyclopentanodimethylpolyhydrophenanthrene series with amalgams of metals from the class consisting of sodium and aluminum, isolating from the reaction mixture the crude pinacones formed, subsequently subjecting said pinacones to a further reduction with an alcohol in the presence of a metal alcoholate as a catalyst, isolating from the reaction mixture the pinacones now substantially free from keto groups and subjecting said pinacones first to acylation and subsequently to the action of oxidizing agents.

13. A process comprising treating androstene-4-dione-3,17 with reducing agents of the type known for forming pinacones from monoketones, and isolating from the reaction mixture the crude pinacones formed.

14. A process comprising treating androstene-4-dione-3,17 with amalgams of metals from the class consisting of sodium and aluminum and isolating from the reaction mixture the crude pinacones formed.

15. A process comprising treating androstene-4-dione-3,17 with reducing agents of the type known for forming pinacones from monoketones, isolating from the reaction mixture the crude pinacones formed and subjecting said pinacones to the action of oxidizing agents.

16. A process comprising treating androstene-4-dione-3,17 with reducing agents of the type known for forming pinacones from monoketones, isolating from the reaction mixture the crude pinacones formed, subsequently subjecting said pinacones to a further reduction with a reducing agent of the type known for the reduction of ketone groups to secondary alcohol groups, isolating from the reaction mixture the pinacones now substantially free from keto groups, and subjecting said reduced pinacones to the action of oxidizing agents.

17. A process comprising treating androstene-4-dione-3,17 with amalgams of metals from the class consisting of sodium and aluminum, isolating from the reaction mixture the crude pinacones formed, subsequently subjecting said pinacones to a further reduction with an alcohol in the presence of a metal alcoholate as a catalyst, isolating from the reaction mixture the pinacones now substantially free from keto groups and subjecting said pinacones to the action of oxidizing agents.

18. A process comprising treating androstene-4-dione-3,17 with reducing agents of the type known for forming pinacones from monoketones, isolating from the reaction mixture the crude pinacones formed and subjecting said pinacones first to acylation and subsequently to the action of oxidizing agents.

19. A process comprising treating androstene-4-dione-3,17 with reducing agents of the type known for forming pinacones from monoketones, isolating from the reaction mixture the crude pinacones formed, subsequently subjecting said pinacones to a further reduction with a reducing agent of the type known for the reduction of ketone groups to secondary alcohol groups, isolating from the reaction mixture the pinacones now substantially free from keto groups, and subjecting said reduced pinacones first to acylation and subsequently to the action of oxidizing agents.

20. A process comprising treating androstene-4-dione-3,17 with amalgams of metals from the class consisting of sodium and aluminum, isolating from the reaction mixture the crude pinacones formed, subsequently subjecting said pinacones to a further reduction with an alcohol in the presence of a metal alcoholate as a catalyst, isolating from the reaction mixture the pinacones now substantially free from keto groups and subjecting said pinacones first to acylation and subsequently to the action of oxidizing agents.

21. As new products the saturated and unsaturated pinacones of the cyclopentanodimethylpolyhydrophenanthrene series having the basic formula:

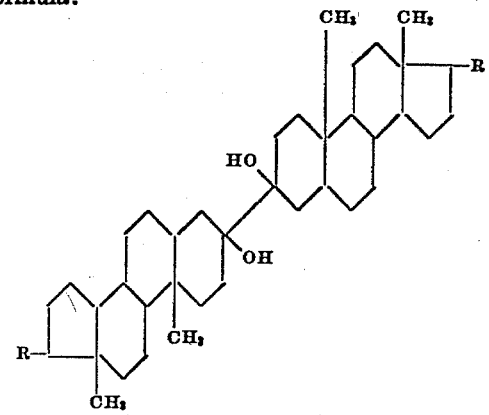

wherein R is a substituent selected from the class consisting of hydroxyl and groups which can be converted to hydroxyl groups by hydrolysis.

22. As a new product, the pinacone having the basic formula:

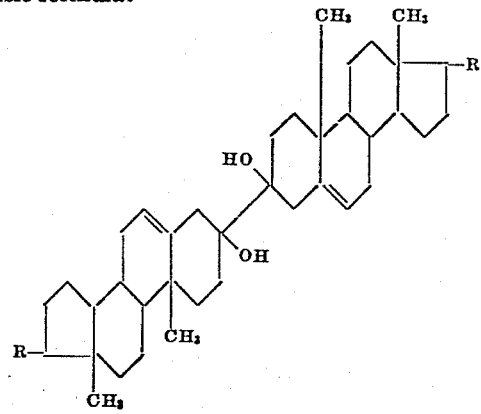

wherein R is a substituent selected from the class consisting of hydroxyl and groups which can be converted to hydroxyl groups by hydrolysis.

RUPERT OPPENAUER.